Oct. 27, 1959     M. KOEHLER     2,910,333
PISTON RING AND METHOD OF MAKING SAME

Filed Oct. 21, 1957

INVENTOR

Max Koehler

By

United States Patent Office 2,910,333
Patented Oct. 27, 1959

2,910,333

PISTON RING AND METHOD OF MAKING SAME

Max Koehler, Witten-Bommern, Germany

Application October 21, 1957, Serial No. 691,204

Claims priority, application Germany October 26, 1956

4 Claims. (Cl. 309—44)

The present invention relates to a piston ring.

It is known to produce piston rings in a powder-metallurgical way by first compressing metal powder in a mold into the shape of a ring, then sintering the thus molded workpiece, and finally cold or hot post-compressing the sintered ring. The said post-compressing step may be effected in such a way that the porosity of the sintered workpiece will be considerably reduced which means that the density of the workpiece will be considerably increased. The still closed ring is then cut open, surface finished, subjected to certain treatments to improve its strength, placed under tension upon the piston, and finally inserted into the respective piston groove.

It has been found desirable to produce piston rings with different strength value in different portions or sections of the rings. In this connection it may be stated that the importance to produce piston rings with different strength values in different portions of the rings, for instance to give the piston ring a greater strength at the ends than at the other portions of the ring, consists in that at the said ends a heat accumulation develops easily which heat accumulation brings about that the ring ends will be pressed inwardly and leakage will occur at said ends.

Furthermore, an increase in strength may also be provided at that portion of the piston ring which is located substantially diagrammatically opposite that portion of the ring where the ring ends come together. An increase in strength at the last mentioned ring portion brings about that the tangential tension of the entire piston ring is increased so that a better contacting pressure is obtained.

To produce piston rings with different strength values in different sections thereof from solid material has heretofore proved rather cumbersome and expensive.

It is therefore, an object of the invention to provide a piston ring of compressed metal powder, which will have cross sections of different strength along its circumference.

This object and other objects and advantages of the invention will appear more clearly from the following specification in connection with the accompanying drawing in which.

The piston ring according to the present invention, which is composed of compressed and sintered metal powder has substantially uniform cross section but different strength values in different portions of the ring may be produced by the following steps: ($a$) The powdered metal of which the ring is to be made is compressed in a mold into a ring having different cross sections along its circumference; ($b$) the thus formed ring is sintered while maintaining different cross sections along its circumference; and ($c$) the sintered ring is post-compressed in a mold into a ring of substantially uniform cross section. Step ($c$) brings about that those portions of the ring which prior to step ($c$) had a larger cross section than other portions of the ring will be compressed to a greater extent than said other portions and consequently will be distinguished from the latter by a reduced porosity and increased strength values.

Figure 1:
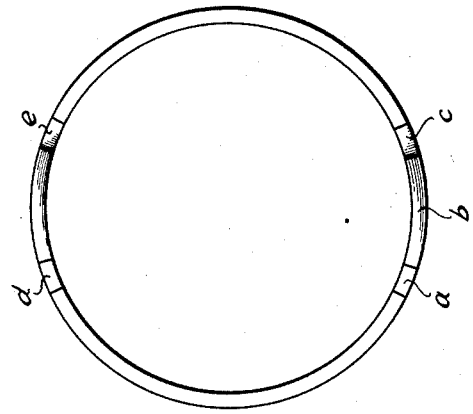
Fig. 1 is a top view of a finish sintered piston ring according to the invention.
Figure 2:
Fig. 2 is a side view of the development of the piston ring of Fig. 1 after the ring has been cut at $b$.

Referring now to the drawing in detail, it will be seen from Fig. 2 showing the ring of Fig. 1 cut open at $b$ and developed, that the sintered ring is higher at the portions between $d$ and $e$ and also between $a$ and $b$ and between $c$ and $b$ so that at these portions the ring has increased cross sections. The die employed in connection with the first compressing of the powder, therefore, has a pressure surface shaped in conformity with the upper contour of the ring as it is shown in Fig. 2. The corresponding recesses of the die may be in the upper or in the lower portion of the die or mold.

For post-compressing the ring, a die or mold is employed which has a plane pressing surface so that the ring will have substantially uniform cross section throughout its length. As a result thereof, the material will be compressed in the sections $a$—$b$, $c$—$b$, and $d$—$e$ to a greater extent than in the sections $a$—$d$ and $c$—$e$ located therebetween. The finished ring thus has different values of density in the individual sections.

For purposes of obtaining better values of the tangential strength, it has proved expedient to employ a greater density of the material at that portion of the ring which is located diametrically opposite the point where the ends of the ring face each other. In addition thereto, it may also be expedient to provide increased density at or near the ends of the ring. When preparing the intermediate form of the ring as it is shown in Fig. 2, the portions of increased cross section may gradually merge with those of smaller cross section as shown in Fig. 2. However, instead of the gradual merging also steps may be provided.

*Example*

A piston ring having an increased density at the ends of the ring as well as at a portion substantially diametrically opposite thereto has been produced in the following manner. A powder mass composed of:

1.5% by weight of graphite
5.0% by weight of lead and
93.5% by weight of iron was used as starting material. This mixture was introduced into a mold the lower portion of which was provided with recesses corresponding as to shape to the elevations illustrated in Fig. 2 by the sections $a$—$b$, $c$—$b$, and $d$—$e$. The powder was then subjected to a pre-compression pressure of approximately 6000 kilograms per square centimeter and was compressed to a ring blank. This ring blank had a height of 4.5 millimeters at the portions of increased cross section, whereas the remaining portion had a height of 3.4 millimeters.

Subsequently, the blank was sintered at a temperature of 1100° C. over a period of approximately 60 minutes. The ring was then cooled to ordinary temperature and for purposes of further favorably influencing the grain structure of the ring, the ring was subjected to a pendulum annealing about the $Ac_1$ point.

The specific weight following the sintering process amounted to 6.8. An analysis yielded the following composition:

1.1% by weight of carbon
3.6% by weight of lead and
95.3% by weight of iron.

The thus obtained ring blank was then post-compressed at a pressure of approximately 15 tons per square centimeter as a result of which a ring of substantially uniform height of approximately 3.2 millimeters was obtained. Due to this post-compression the zones of the blank with increased cross section were compressed by approximately 25% while the remaining cross sections were compressed by approximately 5% only. Due to the strong compression, those zones which with the ring blank had a greater cross section, had a specific weight of 7.8 whereas the remaining portions of the completed ring had a specific weight of 7.0 Following this treatment, the piston ring was cut open at $b$ (see Fig. 1) and was then ready for use.

It is, of course to be understood that the present invention is, by no means, limited to the particular process set forth in the example or the structure shown in the drawing, but also comprises any modification within the scope of the appended claims.

What I claim is:

1. A piston ring composed of sintered metal powder and having pronounced different values of density along its length.

2. A piston ring composed of compressed sintered metal powder, in which those portions of the piston ring which are located substantially diametrically opposite the end portions of the piston ring have a considerably higher density than the major portions of the piston ring.

3. A piston ring composed of compressed sintered metal powder, in which the end portions of the piston ring have a considerably higher density than the major portions of the piston ring.

4. A piston ring composed of compressed sintered metal powder, in which the end portions of the piston ring and those portions of the piston ring which are located substantially diametrically opposite said end portions have a considerably higher density than the major portions of the piston ring.

References Cited in the file of this patent

UNITED STATES PATENTS

| | | |
|---|---|---|
| 2,153,025 | Rais | Apr. 4, 1939 |
| 2,689,492 | Ensign | Sept. 21, 1954 |
| 2,757,446 | Boegehold | Aug. 7, 1956 |
| 2,801,139 | Waibel | July 30, 1957 |